United States Patent
Neufeld et al.

(10) Patent No.: US 7,467,274 B2
(45) Date of Patent: Dec. 16, 2008

(54) METHOD TO INCREASE THE LIFE SPAN OF LIMITED CYCLE READ/WRITE MEDIA

(75) Inventors: E. David Neufeld, Tomball, TX (US); Judy A. Neufeld, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1440 days.

(21) Appl. No.: 10/039,018

(22) Filed: Dec. 31, 2001

(65) Prior Publication Data

US 2003/0126391 A1   Jul. 3, 2003

(51) Int. Cl.
    *G06F 12/00* (2006.01)
(52) U.S. Cl. .................. 711/165; 711/100; 711/102; 711/103; 711/109; 711/114; 711/161; 711/162; 707/205; 709/226
(58) Field of Classification Search .............. 711/4, 711/100, 5, 102–103, 104–105, 165–166, 711/161–162, 109–111, 114; 365/185.29, 365/185.33; 707/205; 709/225
See application file for complete search history.

(56) References Cited

U.S. PATENT DOCUMENTS

| | | | |
|---|---|---|---|
| 5,463,772 A | | 10/1995 | Thompson et al. |
| 5,485,595 A | * | 1/1996 | Assar et al. ................. 711/103 |
| 6,091,686 A | | 7/2000 | Caffarelli et al. |
| 6,230,233 B1 | * | 5/2001 | Lofgren et al. .............. 711/103 |
| 6,240,527 B1 | | 5/2001 | Schneider et al. |
| 6,247,139 B1 | | 6/2001 | Walker et al. |
| 6,275,892 B1 | | 8/2001 | Arnott |
| 6,301,605 B1 | | 10/2001 | Napolitano et al. |
| 6,480,893 B2 | * | 11/2002 | Kriegsman ................. 709/226 |
| 6,606,525 B1 | * | 8/2003 | Muthuswamy et al. ........ 700/52 |
| 6,732,221 B2 | * | 5/2004 | Ban ........................... 711/103 |
| 6,744,670 B2 | * | 6/2004 | Tamada et al. ............ 365/185.19 |
| 6,831,865 B2 | * | 12/2004 | Chang et al. ............. 365/185.33 |
| 2003/0078907 A1 | * | 4/2003 | Soemo et al. ................. 707/1 |

FOREIGN PATENT DOCUMENTS

JP      09160976 A   *   6/1997

OTHER PUBLICATIONS

East CD Creator 5 Platinum, roxio/Direct CD Features, http://www.roxio.com/en/products/ecdc/dcdfeatures.html, 1 page (dated at least as early as Nov. 1, 2001).

(Continued)

*Primary Examiner*—Sanjiv Shah
*Assistant Examiner*—Zhuo H Li

(57) ABSTRACT

A file system technique extends the life cycle of limited read/write media. Rewrite cycles of each file and/or each region of the media may be tracked. Different regions of the media are classified as static and dynamic based on their respective number of rewrite cycles. Static files are migrated to the more worn out or dynamic regions of the media, and dynamic files are integrated to the less worn out or static regions of the media. The file system is further sensitized by allocating a new file to an available region after a most recently used region. Where multiple versions of a data region exist, the file system marks a version of the data region as unstable after a certain number of rewrite cycles to the version and directs rewrite cycles to a subsequent version of the data region.

23 Claims, 6 Drawing Sheets

OTHER PUBLICATIONS

Easy CD Creator 5 Platinum, roxio/Direct CD for Windows FAQs, http://www.roxio.com/en/products/ecdc/dcdfags.html, 2 pages (dated at least as early as Nov. 1, 2001).

Direct CD for Technical FAQs, roxio/Direct CD for Windows Technical FAQs, http://www.roxio.com/en/support/dcdwin/dcdwinfags.html, 2 pages (dated at least as early as Nov. 1, 2001).

* cited by examiner

| Medium Identifier ⌐500 | Rewrite Cycle Threshold ⌐502 |
|---|---|
| | |

FIG. 5

| Region Address ⌐800 | Most Recently Used ⌐802 |
|---|---|
| | |

FIG. 8

| 600 — FILE_1 [Static](Static) |
| 602 — FILE_2 |
| 604 — (Static) |
| 606 — FILE_3 [Dynamic](Dynamic) |
| 608 — FILE_4 |
| 610 — (Static) |

*FIG. 6A*

| 600 — FILE_3 [Dynamic](Static) |
| 602 — FILE_2 [Dynamic](Dynamic) |
| 604 — (Static) |
| 606 — FILE_1 [Static](Dynamic) |
| 608 — FILE_4 |
| 610 — (Static) |

*FIG. 6B*

| 600 — FILE_3 [Dynamic](Static) |
| 602 — (Dynamic) |
| 604 — FILE_2 [Dynamic](Static) |
| 606 — FILE_1 [Static](Dynamic) |
| 608 — FILE_4 |
| 610 — (Static) |

*FIG. 6C*

| 600 — FILE_3 [Dynamic](Static) |
| 602 — FILE_5 (Dynamic) |
| 604 — FILE_2 [Dynamic](Static) |
| 606 — FILE_1 [Static](Dynamic) |
| 608 — FILE_4 |
| 610 — FILE_6 (Static) |

*FIG. 6D*

METHOD TO INCREASE THE LIFE SPAN OF LIMITED CYCLE READ/WRITE MEDIA

CROSS-REFERENCE TO RELATED APPLICATIONS

Not Applicable.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to computer data storage media and more particularly to life span enhancement of the read/write media.

2. Description of the Related Art

Magnetic media, optical media and electronic media form the bulk of the computer data storage media. Of these media, the magnetic media technology is relatively more mature as compared to the other media technologies. Hard drives, floppy disks and tape drives are well known forms of magnetic data storage media. The hard drives have become very reliable, and the technology is well developed. Since the read/write head does not touch the media, the number of rewrite cycles on a hard drive does not significantly impact its life span. In case of floppy drives and tape drives, however, the read/write head comes in contact with the media during the write cycles and thus impacts the life span of the media. The reason CD-R/W media wears out is that two different lasers are used in the read-write operations. The one to erase the media literally melts the substrate and causes the previous pits that were burned in it to disappear. The second laser that writes on the media is more gentle and just burns the little pits. Common file system based techniques to write data on the storage medium use file allocation table (FAT) schemes in which the first available area of the media is allocated for writing or rewriting the file. Further, a file directory on the media is typically located in the initial or beginning area of the media, and this directory is constantly updated with each write cycle. Certain areas of the media, like the file directory, undergo excessive write cycles and tend to degrade much faster than other areas.

Optical media provide large data storage capacity in relatively smaller volume and have become quite economical and thus attractive as a medium of choice. However, the life span of the read/write optical media, commonly referred to as CD-RW, is limited by the write cycles that the media experience. Typically, the optical read/write media has a film material with a solid backing. The write operation is performed by a laser that forms a bit pattern of the information on the film material. During the rewrite cycle, the laser melds the old bit pattern and forms a new bit pattern on the same film. There are two dominant factors that affect the life span of a CD-RW. First, different manufacturers use different film material which range in the number of rewrite cycles they can withstand. Second, different drive manufacturers use different amounts of laser power to write the data on the film. A higher powered laser is generally expected to make a deeper bit pattern and, therefore, provides a more reliable data bit pattern on the film. The capacity of the film to withstand rewrite cycles is reduced because of the lower meld-healing capacity of the film. Thus, a CD-ROM has a limited life since the film may experience the highest number of rewrites that the film can withstand. This unnecessarily shortens the life of the CD-ROM since even one file repeatedly written on a particular region on the CD-ROM degrades that particular CD-ROM area.

In a similar fashion, floppy drives of different capacities suffer excessive degradation of only some sectors where a file, for example the directory file or information, undergoes more revisions than other files. Also, electrically erasable storage media, such as a Sony Memory Stick for example, have limited write cycle life span, and therefore, excessive writing on only a limited region of the media may make the entire media unusable depending on the writing scheme. Thus, rewrite cycles exact a penalty for any read/write storage media involving contact with a write head. In an effort to limit this penalty, one approach has been to reduce the number of rewrite cycles to a disk through write buffering techniques.

BRIEF SUMMARY OF THE INVENTION

A file system technique of enhancing the life span of a read/write storage medium begins with identifying whether a file is a static file or a dynamic file. If the file is a static file, the file is migrated to a dynamic region of the storage medium, and if the file is a dynamic file, the file is migrated to a static region of the storage medium. In another embodiment of the technique, several regions on the media are reserved for multiple versions of certain specific files, like a directory or other files which are expected to undergo a high number of rewrites. After a certain number of rewrite cycles of a version, that version is marked for non-use and rewrite cycles are directed to the subsequent version of the file. When the subsequent version becomes marked for non-use, the technique is applied to a next version of the file. The file system is further sensitized by allocating a new file to an available region after a most recently used region.

BRIEF DESCRIPTION OF THE SEVERAL VIEWS OF THE DRAWINGS

A better understanding of the present invention can be obtained when the following detailed description of some embodiments is considered in conjunction with the following drawings in which:

FIG. 5 is an exemplary table characterizing the media identifier and the corresponding rewrite cycle threshold.

FIGS. 6A-6D are exemplary depictions of stages of moving different files on the media in one embodiment of the technique.

FIG. 8 is an exemplary table to track the most recently used region.

DETAILED DESCRIPTION OF THE INVENTION

Figure 1:
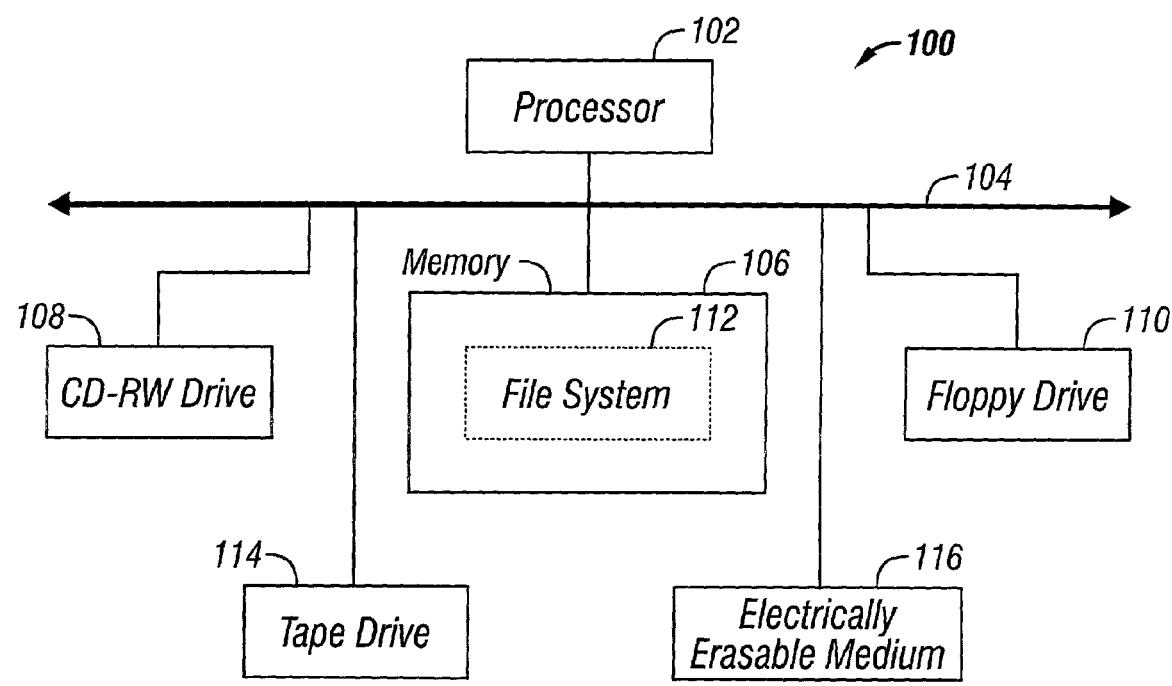
FIG. 1 is a block diagram of a computer system containing examples of read/write storage media in relation to the associated file system.

With reference to FIG. 1, a computer system 100 with some examples of read/write storage media in relation to an associated file system is illustrated. Storage media drives, for example, a Compact Disc-Read/Write (CD-RW) drive 108, a tape drive 114, an electrically erasable media drive 116, and a floppy drive 110 are shown coupled to the processor 112 via a bus 104. Likewise, the memory 106 is coupled to the processor 102. The CD-RW drive 108 reads and writes to an optical media, commonly known as CD-RW. During a rewrite or rewind period, the tape medium comes in contact with the read/write head of the tape drive 114 and causes wear and tear of the tape medium. The electrically erasable media is also subject to wear because of repeated usage. The electrically erasable media, for example, can be a Sony Memory Stick, electrically erasable programmable read only memory (EEPROM), or a SanDisk. The magnetic floppy disk in the floppy drive 110 comes in contact with the read/write head of the floppy drive 110 during its usage and suffers wear. Thus, each of the read/write storage media drives 108, 114, 116 and 110 exact wear on the applicable storage medium.

The file system 112 is a processor executable software that resides in the memory 106. The file system 112 controls and manages all functions relating to file writing and reading, for example (i) keeping track of all the files on the medium, (ii) reallocating specific storage areas to individual files, (iii) moving and erasing files on the storage media and (iv) all other necessary functions relating to file management. The file system 112 is generally a part of the computer's operating system (OS). The processor 102 may include multiple file systems 112 for managing the different type of read/write storage media.

Figure 2:
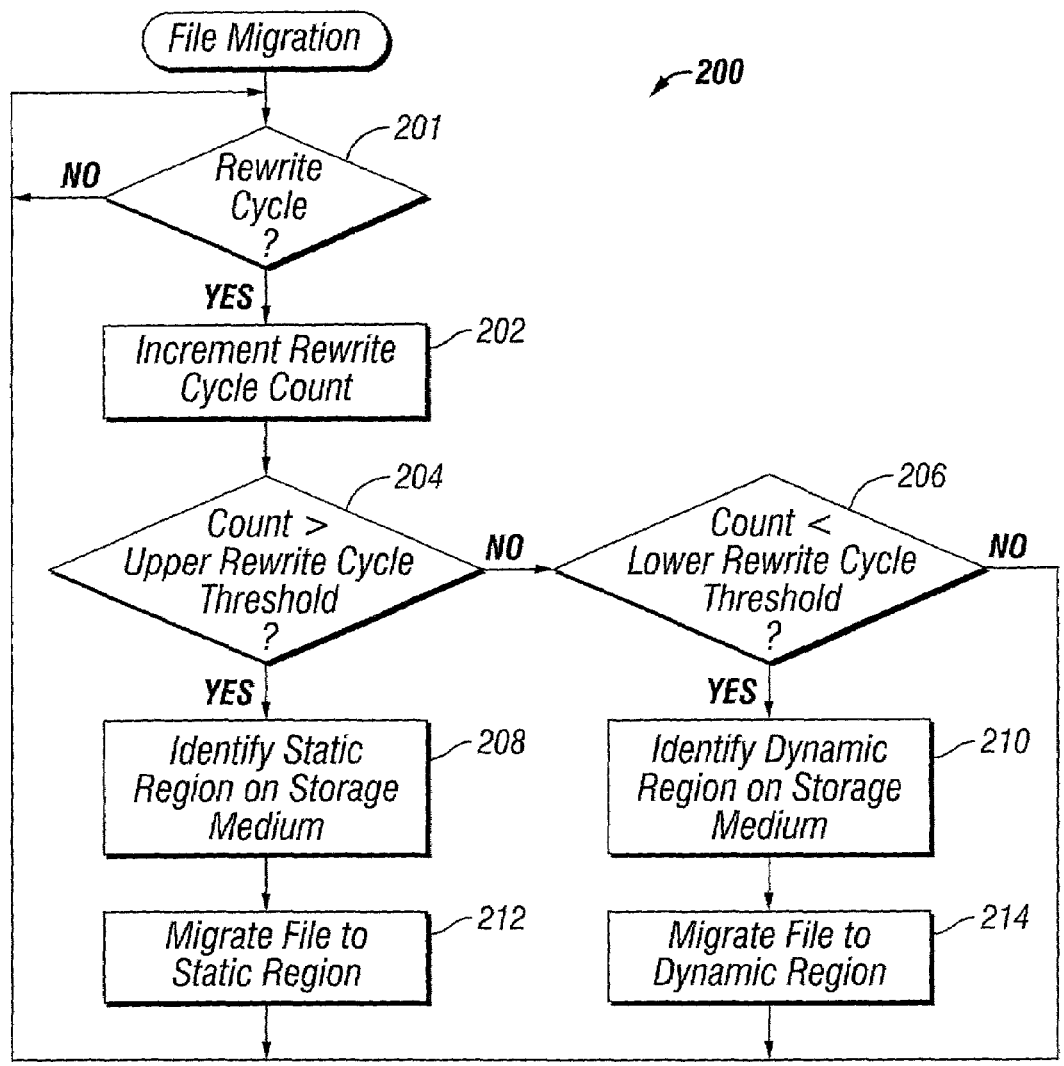
FIG. 2 is a flowchart of an exemplary technique to increase the life span of a limited cycle storage media.

With reference to FIG. 2, a flow chart of an exemplary technique 200 of file migration performed by the file system 112 to increase the life span of a limited cycle storage media is illustrated. According to the technique 200, a rewrite cycle count corresponding to each file, data block or cluster is maintained by the file system 112. In block 201, it is determined whether if there is a rewrite cycle to the file. If so, the control passes to block 202, otherwise control remains in Step 201. In Step 202, a rewrite cycle count for the file is incremented. Step 202 thus serves as a media wear counter by tracking how many rewrite cycles each file and/or each data block on the read/write storage medium has experienced. It should be understood that rewrite cycles can be tracked in a variety of ways. In block 204 if the file rewrite cycle count is greater than an upper rewrite cycle threshold, then in block 208 that particular region is identified as static region of the storage medium. Accordingly, in block 212, the file is migrated to a static region. In block 204, if the count is less than the upper rewrite cycle threshold, then in block 206 the count is compared to the lower rewrite cycle threshold. If the count is less than a lower rewrite cycle threshold in block 206, the region on the storage medium is identified as a dynamic region in block 210. Therefore, according to block 214 the file is migrated to the dynamic region. However, if in block 206 the count is greater than the lower rewrite cycle threshold, the file is written to the same region and no migration is performed. A rewrite cycle threshold for each type of media may be pre-selected based on qualifying testing that media manufacturers and/or computer manufacturers perform. It should be understood that the technique 200 may be adapted for a variety of cases involving migration of static files and dynamic files under certain threshold conditions.

The technique 200 spreads wear or distributes the load of rewrite cycles across the particular storage medium. More specifically, the technique 200 sensitizes the file system 112 to static and dynamic regions of the read/write storage medium. Based on this file system sensitivity, the technique 200 dynamically migrates static files to more worn or dynamic areas and dynamic files to less worn or static areas. A file with rewrite cycle count less than a certain predetermined lower rewrite cycle threshold is considered to be a static file. A file with a rewrite cycle count greater than a certain predetermined upper rewrite cycle threshold is considered a dynamic file.

Different regions of the media are tracked to define static regions and dynamic regions based on the rewrite cycles experienced by those regions. The static regions and dynamic regions of the media may be identified by tracking the rewrite cycle count for each file as mentioned above. For example, location of a dynamic file may indicate a dynamic region and location of a static file may indicate a static region. Thus, history of which files were located in which regions can be tracked and in that way a region which has experienced a high number of rewrite cycles can be identified as dynamic even if a dynamic file has already been relocated from that region. For example, an empty region can be identified as dynamic even if the dynamic file has been relocated.

Figure 3:
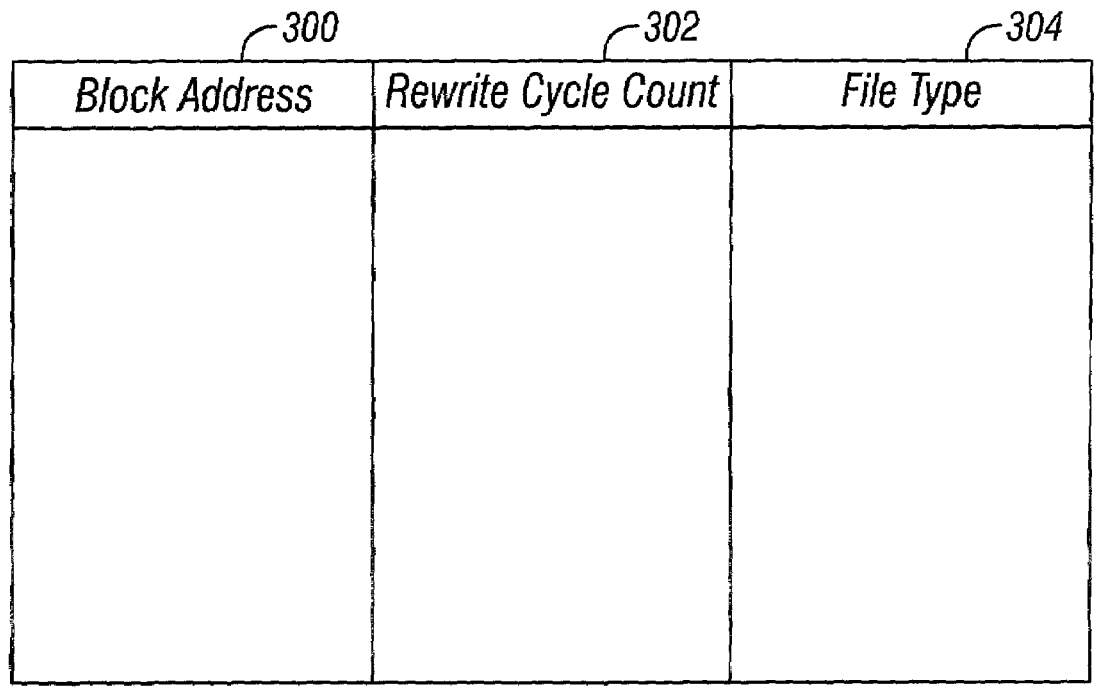
FIG. 3 is an exemplary table of the block address, rewrite cycle count and the file type embedded in a file system.

With reference to FIG. 3, an exemplary table of the block address 300, rewrite cycle count 302, and the file type 304 embedded in a file system is illustrated. The file type 304 indicates the type of file stored in the block address 300. In one embodiment, determining whether the file is a static file or a dynamic file can be predictive identified through the type of the file. For example, a spreadsheet file can be treated as a dynamic file in anticipation of numerous updates with new data. According to FIG. 3, since the actual number of rewrite cycles is being tracked by the rewrite cycle count 302, the files can be later reclassified as static files if there is low number of rewrite cycles after a certain period of time. Similarly, other files, such as those types of files which are rarely updated for example, graphic files, executable files, or files that cannot be updated like read-only files, can be initially treated as static files based on the file type, and later reclassified as dynamic files if there is a high number of rewrite cycles after a certain period of time. The rewrite cycle count 302 for a block or cluster stored in the block address 300 of the storage media is updated with any rewrite cycle to a block or cluster. Rewrite cycles may be tracked for blocks or clusters rather than files since files may be stored across blocks or clusters. In another embodiment, the table shown in FIG. 3 may also be used to track the size of files as a factor in determining which data need to be relocated. Depending on the type of read/write media, it may be useful to track cycles other than rewrite cycles. With tape drives 114 for example, the rewind cycles may also be tracked since such cycles involve rubbing the tape by the read/write head and therefore contribute to wear of the media.

Figure 4:
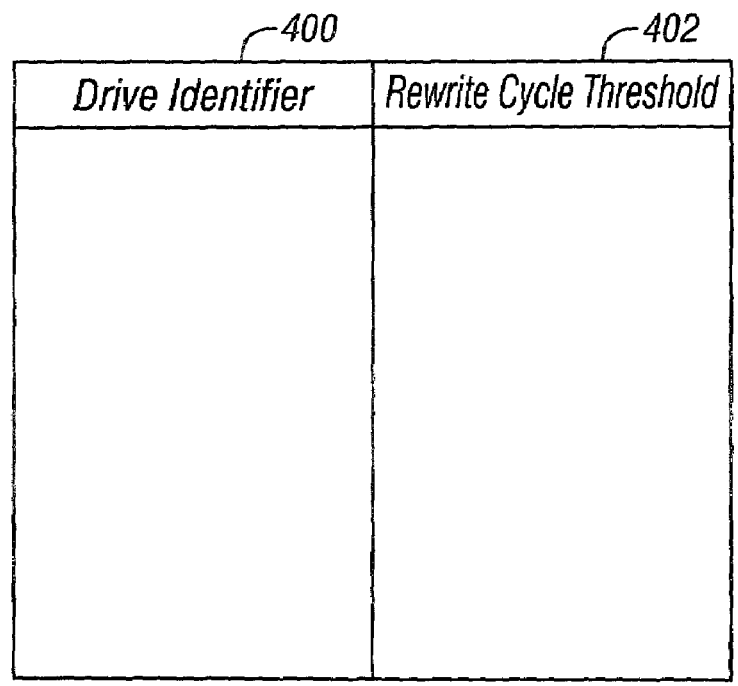
FIG. 4 is an exemplary table characterizing the drive identifier and the corresponding rewrite cycle threshold.

With reference to FIG. 4, an exemplary table to store the drive identifier 400 and the corresponding rewrite cycle threshold 402 is illustrated. Since different hardware manufacturers use read/write heads, lasers, or other read/write devices of different quality and type, the life of the read/write media varies accordingly. For example, laser power used by different CD-RW drive manufacturers may vary considerably, thus affecting the read/write life cycle of the CD-RW medium. To account for such differences, a rewrite cycle threshold may be maintained for each model of a read/write drive of each manufacturer. Each processor 102 or device driver for the storage medium generally knows the identity of the read/write drive. The drive identifier 400 and the rewrite cycle threshold 402 of the read/write media may be used to establish the upper rewrite cycle threshold and the lower rewrite cycle threshold of the read/write media. The upper rewrite cycle threshold and/lower rewrite cycle threshold thus may differ depending on the particular read/write drive identified. While the rewrite cycle threshold itself may be used as the upper rewrite cycle threshold, the lower rewrite cycle threshold may be a certain percentage of the rewrite cycle threshold. Similarly, the rewrite cycle threshold 402 of the read/write media may determine the value of the wear counter of the read/write media. The data of FIG. 4 may be stored as part of a file allocation table (FAT) or elsewhere in the computer 100.

Now referring to FIG. 5, an exemplary table of read/write media identifier 500 and the corresponding rewrite cycle threshold 502 is illustrated. The read/write media identifier specifies the media type which factors into the decision making such as described in connection with FIG. 2. The media type can be provided by the user or retrieved from a storage area of the media. The data in this table may be generated on an ongoing basis to determine the upper rewrite cycle threshold of a read/write media by the technique of self testing. According to this exemplary technique, a data block or sector on the read/write media is reserved for repeatedly subjecting the block or sector to rewrite cycles. Eventually, that reserved data block becomes overly worn. The repeated writing to that particular block of the media helps determine the maximum number of rewrite cycles that the media can reasonably withstand. In selecting a proper rewrite cycle threshold, a suitable margin can be applied to the maximum number of rewrite cycles determined. In this way, the process allows for variations among blocks as to relative resistance to rewrite cycles. The amount of margin may be user selected or instead based on the particular drive. This technique basically corresponds to self-destructing a specific region of the media to determine its upper rewrite cycle threshold. Each rewrite cycle may involve test data which is immediately verified by read cycles of the data just written on the test block of the media. The degree to which the block becomes overly worn or unstable may be characterized in a variety of ways. For example, in complex cases, constant linear velocity or constant radial velocity may be utilized characterize wear across the media.

FIGS. 6A-6D provide an exemplary depiction of moving different files on the media according to one embodiment of the technique. In this example, FIG. 6A shows FILE_1 is a static file in static location 600 of the media. In these tables, the bracketed term indicates whether the file is static or dynamic and the term in parenthesis indicate whether the region is static or dynamic. FILE_2 at location 602 is for the time being uncharacterized. Location 604 is a blank static region of the media. It should be understood that blank regions begin as static unless located in directory areas. As will be apparent from this disclosure, files can be characterized as static or dynamic based on usage on the type of file. FILE_3 at location 606 is a dynamic file in a dynamic region. FILE_4 at location 608 is unclassified as to the type of file or the region. Location 610 does not contain a file and is classified as a static region. In FIG. 6B, the locations of FILE_1 and FILE_3 are exchanged and FILE_2 becomes a dynamic file in a dynamic region because its number of rewrite cycles become greater than the predetermined rewrite cycle threshold. Since FILE_1 is a static file, it is not expected to undergo a high number of rewrite cycles during the life of the media. Therefore, FILE_1 may be moved to dynamic location 606—a dynamic or more worn region from static location 600. This file movement is preemptive and frees up an additional static region. FILE_3 from dynamic location 606 is moved to static location 600 where FILE_3 remains a dynamic file. Dynamic location 606 is thus not exposed to additional rewrite cycles due to FILE_3. Further rewrite cycles may change the static location 600 into a dynamic region over a period of time. During this period of time FILE_2 has been rewritten an adequate number of times for the location 602 to become a dynamic region and the FILE_2 to become a dynamic file. From FIG. 6B to 6C, FILE_2 is relocated from dynamic location 602 to a static location 604. In this way, dynamic location 602 is not exposed to additional rewrite cycles due to FILE_2. In transition from FIG. 6C to FIG. 6D a new file FILE_5 is created in the dynamic location 602 and FILE_6 is created in static location 610. In this example, FILE_5 based on file type, for example, a read-only file is predicted to be a static file, and FILE_6 based on the file type is predicted to be a dynamic file. Alternative techniques for space allocation may be devised based on different aspects of the file management structure, for example using the FAT table. The FAT table may be scanned and the least cycled space may be allocated to a new file. If a static location is not available to allocate to the new file, then static and dynamic files may be shuffled to free up static locations.

Figure 7A:
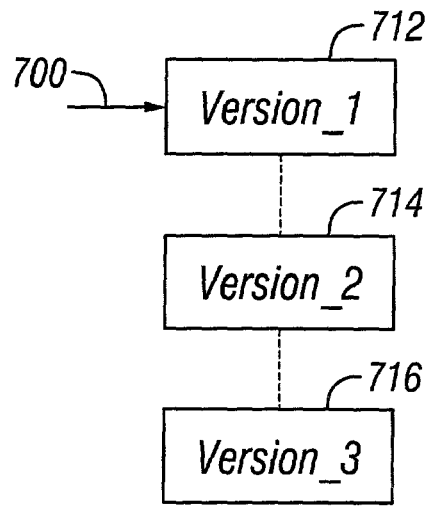
FIGS. 7A-7C are exemplary techniques depicting storage and marking of different versions of the files on the media.
Figure 7B:
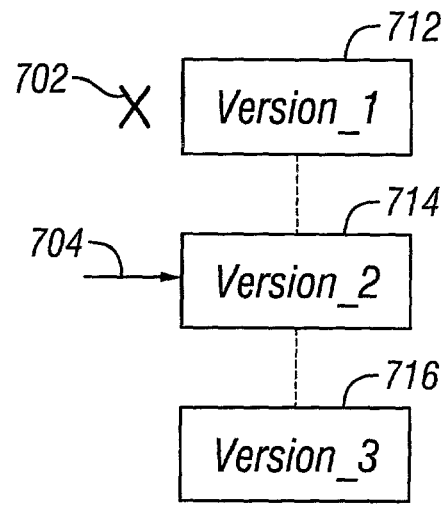
Figure 7C:
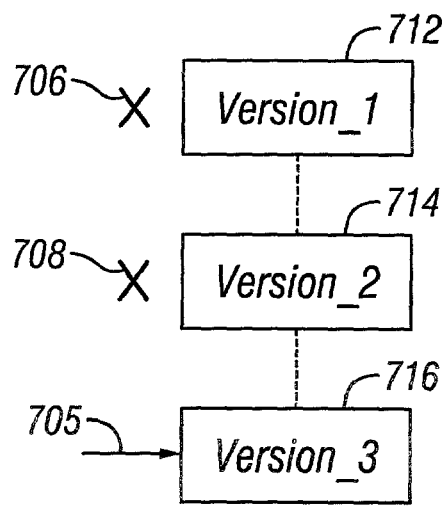

With reference to FIGS. 7A-7C, a technique for storing and marking differing versions of a file on the media is illustrated. It is recognized that certain files, for example, the file allocation table (FAT), and directory, would necessarily undergo the most changes. In this embodiment, multiple regions on the media are reserved for different versions of the specific file. For example, Version_1 is reserved at location 712, Version_2 is reserved at location 714, and Version_3 is reserved at location 716. When a version of a data region becomes unstable after a number of rewrite cycles for that version exceeds a predetermined rewrite cycle threshold, that location of the media is marked unstable, and further rewrite cycles are directed to the next version of the data region until that version exceeds a predetermined rewrite cycle threshold. The data locations of Version_1, Version_2, and so on, can be linked for ease of directing the next write cycles to the next version location. Locations for versions may be dedicated or reserved locations on the media. Version_1 is reserved in location 712, Version_2 is reserved in location 714, and Version_3 is reserved in location 716. For FIGS. 7A-7C, an arrow represents a pointer indicating the current Version of the file receiving the rewrite cycles and an "X" symbol represents a marked Version. In FIG. 7A, Version_1 is the current version as indicated by pointer 700. In transition from FIG. 7A to FIG. 7B, Version_1 in location 712 is marked unusable as indicated by the "X" symbol 702, and the file system is directed to rewrite cycles to Version_2 in location 714 as indicated by pointer 704. Likewise, when the Version_2 in FIG. 7B becomes unstable, the file system directs the next set of rewrite cycles to area 716 as Version_3 as indicated by arrow 705. At this point, both Version_1 and Verison_2 are marked for non-use as indicated respectively by "X" symbols 706 and 708. This technique may be extended to any frequently used file.

Now with reference to FIG. 8, an exemplary table to track the most recently used region is shown. In this technique, a table for a region address 800 and an indication of whether the corresponding region is the most recently used area 802 is tracked. Tracking the most recently used region may utilize a semaphore, a pointer or an algorithm for example. The most recently used region thus may be tracked in a variety of ways. The file system 112 keeps track of all regions of the media, and is already aware which regions of the media are available. In this technique, following a file allocation request, a new file is allocated to an available region after the most recently used region of the media as determined by most recently used indicator 802. Alternatively, the technique may scan across the FAT table to find free space for a new file. This ensures that the same regions of the media are not overly used for rewrite cycles and thus not overly worn due to new files in unsuitable locations. The region, for example, may represent a block or cluster on the media. The most recently used region of the media is saved even if the computer system 100 is rebooted or the medium is removed and reinserted. For example, this may be accomplished by saving the scan pointer in the FAT table or saving a usage counter associated with the blocks/clusters represented in the FAT table. The static regions of the media may be overwritten by new files if all other regions are being used.

While the above techniques have been discussed from the perspective of the file system for illustrative purposes, these techniques may alternatively be implemented as a device driver or other software layer that reserves space on the media to track how many rewrite cycles are performed on each particular block of the media. Thus, the file system itself could be unaware of such tracking and resulting file migrations. When the device driver is updated, the driver should maintain the tracked information such as on the media.

The foregoing disclosure and description of the various embodiments are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A method of enhancing a life span of a read/write storage medium, the method comprising the steps of:
    identifying whether a file on a read/write storage medium is a static file or a dynamic file;
    migrating the file to a dynamic region of the read/write storage medium if the file is a static file; and
    migrating the file to a static region of the read/write storage medium if the file is a dynamic file.

2. The method of claim 1, the identifying step comprising the step of:
    counting a number of rewrite cycles of the file.

3. The method of claim 2, the identifying step comprising the step of:
    comparing the number of rewrite cycles of the file to a predetermined rewrite cycle threshold.

4. The method of claim 3, wherein the predetermined rewrite cycle threshold is associated with a read/write storage medium identifier.

5. The method of claim 3, wherein the predetermined rewrite cycle threshold is associated with a drive identifier for the read/write storage medium.

6. The method of claim 3, wherein the predetermined rewrite cycle threshold is based on self-testing by performing rewrite cycles to a data block of the read/write storage medium until the data block is unstable.

7. The method of claim 3, wherein the predetermined rewrite cycle threshold is stored in a file allocation table.

8. The method of claim 2, wherein the number of rewrite cycles of the file is stored in a file allocation table.

9. The method of claim 1, wherein the read/write storage medium comprises a compact disk read/write disk.

10. The method of claim 1, wherein the read/write storage medium comprises a tape drive.

11. The method of claim 1, wherein the read/write storage medium comprises a floppy disk drive.

12. The method of claim 1, wherein the read/write storage medium comprises an electrically erasable medium.

13. A file system adapted to enhance a life span of a read/write storage medium, the system comprising:
    a means for identifying whether a file on a read/write storage medium is a static file or a dynamic file;
    a means for migrating the file to a dynamic region of read/write storage medium if the file is a static file; and
    a means for migrating the file to a static region of the read/write storage medium if the file is a dynamic file.

14. The file system of claim 13, the means for identifying comprising:
    a counter to count a number of rewrite cycles of the file.

15. The file system of claim 14, the means for identifying comprising:
    a means for comparing the number of rewrite cycles of the file to a predetermined rewrite cycle threshold.

16. The file system of claim 13, the means for identifying comprising:
    a means for identifying a file type of the file, wherein the file is initially identified as static or dynamic based on the file type of the file.

17. A computer system adapted for enhancing a life span of a read/write storage medium, the system comprising:
    a processor-executable file system adapted to:
        identify whether a file on a read/write storage medium is a static file or a dynamic file;
        migrate the file to a dynamic region of the read/write storage medium in response to identifying the file as a static file; and
        migrate the file to a static region of the read/write storage medium in response to identifying the file as a dynamic file.

18. The computer system of claim 17, wherein the file system identifies the file as a static file or dynamic file based on counting a number of rewrite cycles of the file.

19. The computer system of claim 18, wherein the file system identifies the file as a static file or dynamic file based on comparing the number of rewrite cycles of the file to a predetermined rewrite cycle threshold.

20. The method of claim 1, wherein identifying whether the file is a static file or a dynamic file comprises initially identifying whether the file is a static file or a dynamic file based on a type of the file.

21. The method of claim 20, wherein identifying whether the file is a static file or a dynamic file comprises reclassifying the file, based on a number of rewrite cycles to the file, from the initial identification of a static file or a dynamic file.

22. The method of claim 3, further comprising setting the predetermined rewrite cycle threshold based on a type of the read/write storage medium.

23. The file system of claim 16, wherein the means for identifying whether the file is a static file or dynamic file reclassifies the file, based on a number of rewrite cycles to the file, from the initial identification of a static file or a dynamic file.

* * * * *

UNITED STATES PATENT AND TRADEMARK OFFICE
CERTIFICATE OF CORRECTION

PATENT NO. : 7,467,274 B2
APPLICATION NO. : 10/039018
DATED : December 16, 2008
INVENTOR(S) : E. David Neufeld et al.

Page 1 of 1

It is certified that error appears in the above-identified patent and that said Letters Patent is hereby corrected as shown below:

On the Title Page, Item (56), under "Other Publications", line 1, delete "East" and insert -- Easy --, therefor.

Signed and Sealed this

First Day of December, 2009

David J. Kappos
*Director of the United States Patent and Trademark Office*